No. 735,255. Patented August 4, 1903.

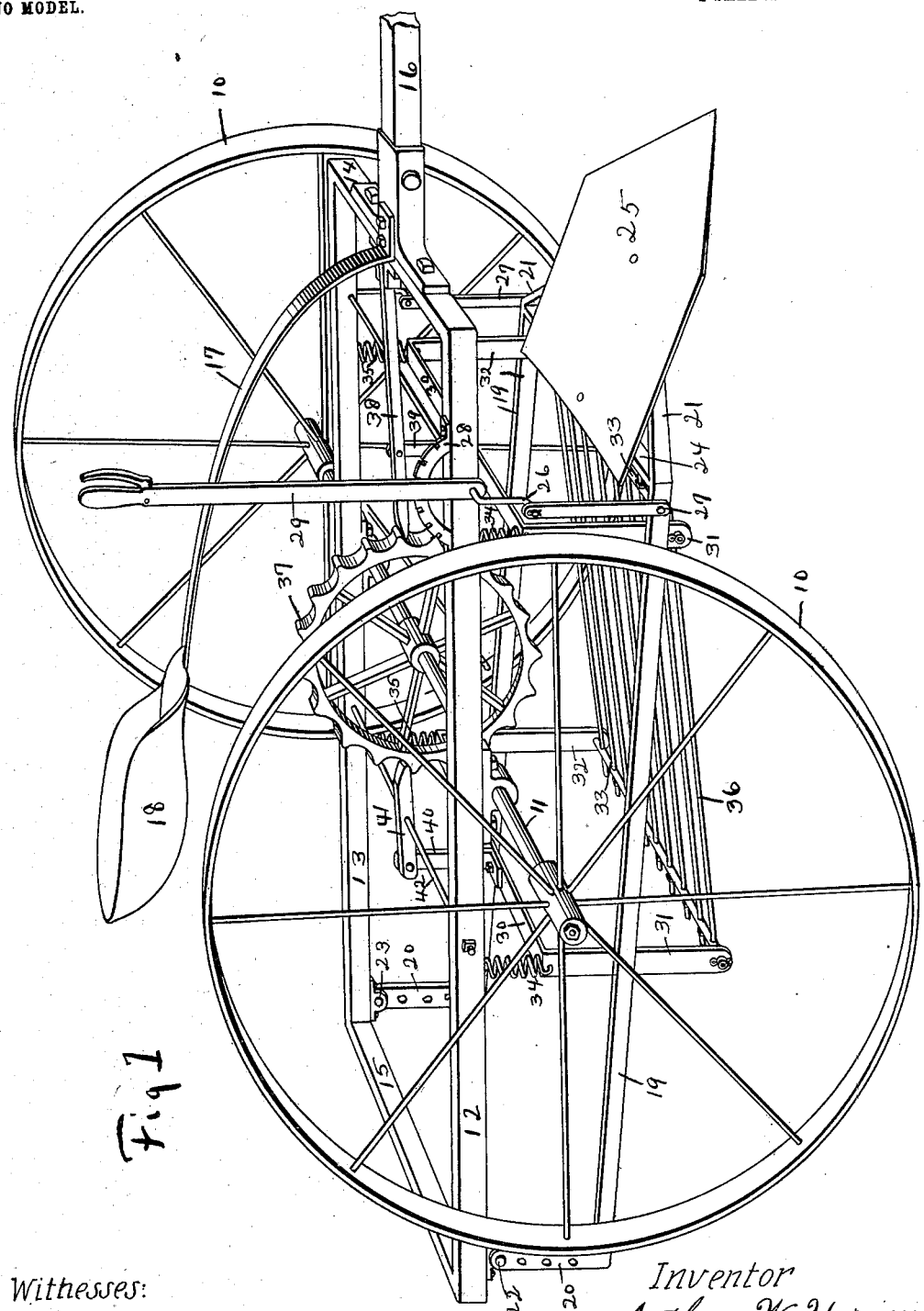

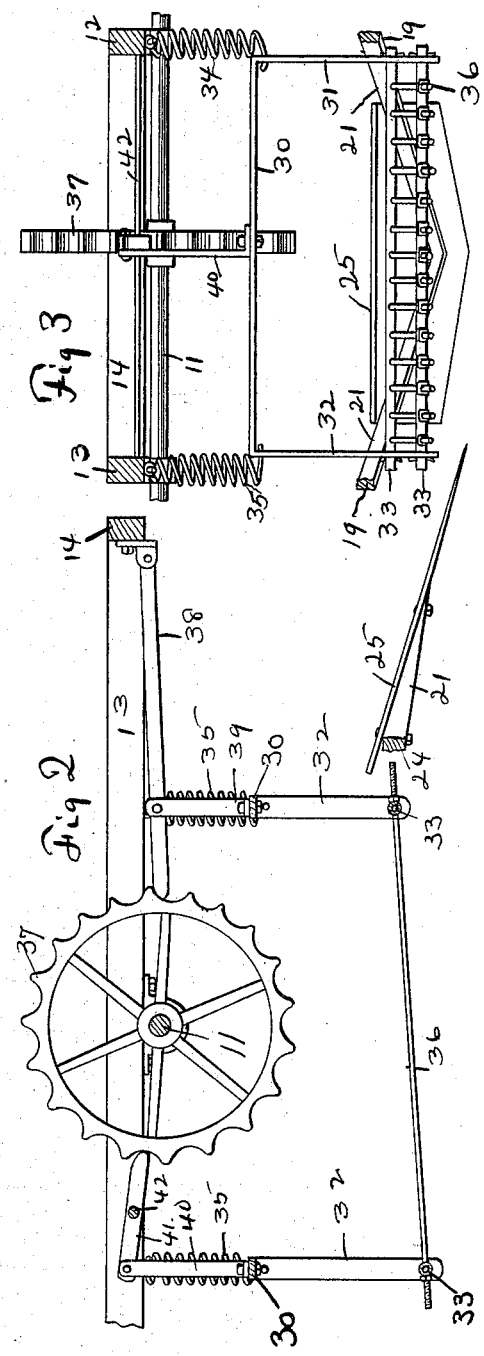
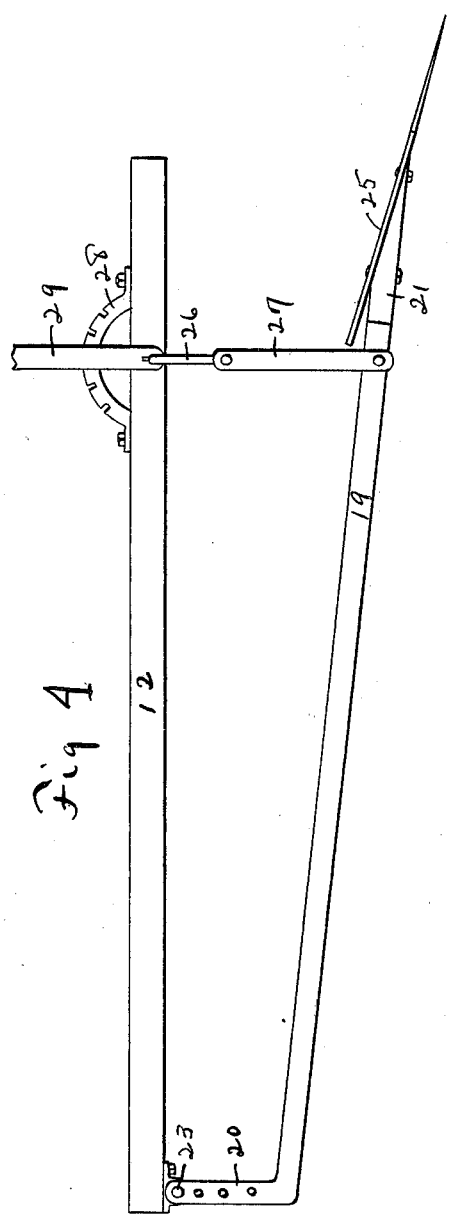

UNITED STATES PATENT OFFICE.

ARTHUR W. HARVEY, OF ALTOONA, IOWA.

POTATO-DIGGER.

SPECIFICATION forming part of Letters Patent No. 735,255, dated August 4, 1903.

Application filed October 11, 1902. Serial No. 126,958. (No model.)

*To all whom it may concern:*

Be it known that I, ARTHUR W. HARVEY, a citizen of the United States, residing at Altoona, in the county of Polk and State of Iowa, have invented certain new and useful Improvements in Potato-Diggers, of which the following is a specification.

The objects of my invention are to provide a simple, durable, and inexpensive potato-digger in which I have a shaking-frame that will thoroughly shake the dirt from the potatoes after they have been dug and allow them to be dropped at the rear of the frame.

A further object is to provide a shaking-frame which will allow the potatoes and the potato-tops to pass over the frame, and as the potatoes are severed they will drop to the ground from the shaking-frame before the potato-tops and allow the potatoes to be covered by the potato-tops, and thus protect them from the sun after they have been dug and before they have been picked up.

A further object is to provide a shaking-frame which is designed to be operated by means of a cam-wheel mounted on the main shaft of the potato-digger, which cam-wheel is so arranged as to drive the shaking-frame downwardly and away from the main frame of the machine, and the coil-springs, which are attached to the main frame and to the shaking-frame, will cause the shaking-frame to be drawn upwardly, and thus cause a vertically-shaking frame.

A further object is to provide means attached to the main frame of the potato-digger whereby the shovel may be easily raised or lowered, so that the shovel will dig into the ground at any desired depth.

The principal object of my invention is to provide a vertically-reciprocating frame for shaking the dirt off the potatoes which is of simple and durable construction.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows in perspective the complete potato-digger. Fig. 2 is a side elevation of the reciprocating frame and the cam-wheel which operates the reciprocating frame and the means attached to the reciprocating frame engaging the cam-wheel. In this view the rear portion of the main frame is broken away, and the main frame is also cut in cross-section at its forward end, as is the front portion of the shovel-supporting device. Fig. 3 is a cross-sectional view of my device, cut through the frame behind the point of attachment of the shaking-frame, with the traction-wheels removed; and Fig. 4 is a side elevation of the shovel-supporting device, showing the way in which it is attached to and supported by the main frame.

Referring to the accompanying drawings, I have used the reference-numeral 10 to represent the traction-wheels of my digger. Said traction-wheels are firmly mounted on the shaft 11 between them. Mounted on the shaft 11 and between the traction-wheels 10 I have provided a main frame having the sides 12 and 13 therein and having the forward end portion 14 and the rear end portion 15, connecting the sides 12 and 13. These side and end portions comprise the main frame of my potato-digger, and this main frame is mounted, as I have intimated, on the shaft 11 and between the traction-wheels 10 of the potato-digger.

Attached to the front end 14 of the main frame is the pole 16, to which the draft-animals are to be attached. Also attached to the front end 14 of the main frame is the seat-support 17, which support extends rearwardly and upwardly from the front end 14 and has a seat portion 18 at its rear end, said seat portion being very nearly above the shaft 11. Pivotally mounted near the rear end 15 of the frame and to the sides 12 and 13 thereof is the shovel-supporting device, having the body portion 19, the rear end portion 20, and the forward end portions 21. The forward portions 21 of the two sides of the shovel-supporting device meet each other at their forward extremity and at their rearward extremity are made integral with the body portion 19. The body portions 19 of the shovel-supporting device are substantially parallel with each other, and the rear end portions 20 of them extend substantially at right angles to the body portions 19 and upwardly from said portions to their points of attachment 22 and 23 in the main frame. Between the forward ends of the body portions 19 of the shovel-supporting device and near the point where the body portions 19 are united to the portions 21 I have mounted the cross-bar 24 to support the rear end of the shovel 25, which is mounted near its central portion to the forward end of the portions 21 and at its rear portion to the cross-bar 24. The shovel 25 is pointed at its forward end, and the sides of it are substantially parallel with each other. The shovel 25 is slightly narrower than the distance between the body portions 19 of the shovel-supporting device. Mounted in the sides 12 and 13 of the main frame and near the forward portions thereof in such a way that portions of it extend outside of the sides 12 and 13 of the main frame is the lever 26. At the lower extremity of the portions outside the sides 12 and 13 of the lever 26 I have pivotally mounted the upper ends of the supporting-rods 27, said supporting-rods being pivotally attached at their lower end to the forward end of the body portions 19.

Mounted on top of the side 12 of the main frame and near the forward end thereof is the notched sector 28. Firmly mounted on the lever 26 in such a way that its inner side will rest against the exterior side of the side 12 and the exterior side of the notched sector 28 is the lever 29, said lever having means for holding it in position relative to the notched sector 28. It will be clearly seen that as the upper end of the lever 29 is moved forwardly or rearwardly the lower ends of the lever 26 will be moved in the opposite direction. The lever 26 and the supporting-rods 27, which support the forward end of the shovel-supporting device, so that when the lever is adjusted the forward end of the shovel-supporting device will be moved upwardly or downwardly, and the shovel-supporting device will be swung on its pivotal points of attachment 22 and 23. Between the body portions 19 of the shovel-supporting device and at the rear of the shovel 25 I have provided a shaking-frame having a rear portion therein, said rear portion comprising the top 30 and the two sides 31 and 32, said sides being integral with the body portion and extending at right angles to the body portion 30 from the ends thereof in such a way that the portions 31 and 32 are substantially parallel with each other. These portions extend downwardly from the top portion 30. Connecting the lower ends of the sides 31 and 32 of the rear portion of the shaking-frame is the rod 33, said rod being mounted substantially parallel with the top portion 30. This rear portion of the shaking-frame is attached to the main frame a slight distance behind the main shaft 11 by means of the contractile coil-springs 34 and 35.

Near the forward end of the frame and behind the shovel 25 is the forward end portion of the shaking-frame, said forward end portion being constructed in the same way as the rear portion and having its parts numbered corresponding to the parts on the rear end of the shaking-frame, the only difference being that the side portions 31 and 32 in the front portion of the shaking-frame are shorter than the portions 31 and 32 of the rear portion of the shaking-frame, so the rod 33 connecting the lower ends of the sides of the rear end of the shaking-frame is lower than the rod 33 connecting the lower end of the sides 31 and 33 of the front portion of the shaking-frame for purposes hereinafter made clear. The front portion of the shaking-frame is attached to the sides 12 and 13 of the main frame by means of the contractile springs 34 and 35 in the same way as the rear portion of the shaking-frame is supported by means of the contractile springs 34 and 35. Thus the forward end of the shaking-frame has two springs attached to it and to the main frame, and the rear end of the shaking-frame has two springs attached to it and to the main frame. Mounted in the rod 33 of the forward end portion of the frame and extending rearwardly and downwardly through the rods 33 at the lower end of the rear portion of the shaking-frame is a series of parallel rods 36, each rod of said series of rods 36 being also attached to the rod 33 at the lower end of the sides 31 and 32 of the rear portion of the shaking-frame. Firmly mounted on the central portion of the shaft 11 is a cam-wheel 37, said cam-wheel having a series of projections on its exterior and said projections being equidistant from each other throughout the entire circumference of the cam-wheel, said projections extending outwardly from the body portion of the wheel. Pivotally attached to the front end 14 of the main frame and extending rearwardly therefrom until its rear end engages the cam-wheel is the rod 38, said rod 38 being pivotally attached to the top 30 of the front end portion of the shaking-frame by means of the connecting-link 39. This rod 38 is so arranged that as the cam-wheel is rotated the rear end of the rod 38 will be forced downwardly, and consequently the forward end of the shaking-frame will be correspondingly forced downwardly, and the resiliency of the coil-springs 35 will draw the forward end of the frame upwardly until the rear end of the rod 38 engages the next projection of the cam-wheel 37, thus causing the forward end of the shaking-frame to be reciprocated.

Firmly attached to the top portion 30 of the rear end of the shaking-frame is the upright 40, said upright being attached to the central portion of the part 30 and extending substantially at right angles to it. Pivotally mounted at the top portion of the upright 40 is the rod 41, said rod extending forwardly from its point of attachment until it is in engagement with the cam-wheel 37, mounted between the sides 12 and 13 of the main frame and substantially parallel with the ends 14 and 15 of said frame and extending through the rod 41 in such a way as to make the rod 41 pivotally mounted on it. The rod 42 is designed to support the rod 41 and hold it in position against the cam-wheel 37. Then as the forward end of the rod 41 is forced upwardly by the projection on the cam-wheel 37 the rear end of said rod will be forced downwardly and will correspondingly force the rear end of the shaking-frame downwardly, and then the springs which are attached to the rear end of the shaking-frame will cause this shaking-frame to be drawn upwardly until the rod 41 engages the next succeeding projection on the cam-wheel 37, and by these means the rear end of the shaking-frame will be reciprocated. Thus by the means above described the entire shaking-frame will be reciprocated, relative to the main frame, and the potatoes, which are designed to pass over the series of rods 36 in the shaking-frame, will be forced rearwardly and the dirt on the potatoes will be shaken off by the vertical reciprocation of the shaking-frame. Any arrangement for throwing the mechanism in and out of gear may be used in connection with the cam-wheel 37; but as I do not claim anything for this arrangement I have not shown it.

In practical use after the draft-animals have been attached to my digger the operator adjusts the forward end of the shovel by means of the lever 29 and holds the shovel and its supporting device in any desirable position for digging, and my digger is ready for use. As the draft-animals draw the digger forwardly the shovel will cause the potatoes to be dug, and the forward movement of it causes the potatoes to be forced rearwardly on the shovel and onto the series of rods 36, and as the shaking-frame in which the rods 36 are mounted is constantly reciprocating vertically relative to the main frame the potatoes will be thoroughly shaken upon coming in contact with the rods 36. On account of the rods 36 sloping rearwardly from their point of attachment at the forward end of the shaking-frame the potatoes on the rods will slide rearwardly and be dropped from the rear ends of the shaking-frame on the ground.

Having thus described my invention, what I claim, and desire to secure by Letters Patent of the United States therefor, is—

1. In a potato-digger, the combination with a main frame, of a shovel pivotally attached to the main frame, a shaking-frame at the rear of the shovel and mounted beneath the main frame, springs attached to the main frame and to the shaking-frame for supporting the shaking-frame, means for forcing the shaking-frame downwardly to cause vertical reciprocation of the shaking-frame relative to the main frame.

2. In a potato-digger, a main frame, a shaking-frame attached by springs to the main frame, means mounted between the sides of the main frame for forcing the shaking-frame downwardly against the resistance of the springs, for the purposes stated.

3. In a potato-digger, a main frame, a shovel pivotally attached to the main frame and extending in front of it, a shaking-frame beneath the main frame, springs attached to the main frame and to the shaking-frame, traction-wheels outside of the main frame, a shaft connecting said traction-wheels and extending through the sides of the main frame, a cam-wheel mounted on said shaft, means attached to the main and to the shaking frame so arranged that as the cam-wheel revolves portions of said means will be engaged and cause the shaking-frame to be moved downwardly, for the purposes stated.

4. In a potato-digger, a main frame, a shaking-frame, springs supporting the shaking-frame beneath the main frame, a shaft extending across the main frame, a cam-wheel on said shaft, a rod pivotally attached to the front of the main frame and to the shaking-frame, the rear end of said rod engaging said cam-wheel, a second rod mounted between the sides of the main frame and at the rear of said shaft, a third rod pivotally mounted on said second rod and pivotally mounted at one end to the shaking-frame and engaging the cam-wheel at its other end, for the purposes stated.

5. In a potato-digger, a main frame, a shaking-frame, springs supporting the shaking-frame beneath the main frame, a shaft extending across the main frame, a cam-wheel on said shaft, a rod pivotally attached to the front of the main frame and to the shaking-frame, the rear end of said rod engaging said cam-wheel, a second rod mounted between the sides of the main frame and at the rear of said shaft, a third rod pivotally mounted on said second rod and pivotally mounted at one end of the shaking-frame and engaging the cam-wheel at its other end, a shovel pivotally attached to the main frame in front of the shaking-frame, for the purposes stated.

ARTHUR W. HARVEY.

Witnesses:
J. RALPH ORWIG,
W. R. LANE.